Nov. 8, 1938.    W. A. CARNES    2,135,796

BRAKE

Filed March 21, 1936

Inventor
William A. Carnes
By
Hardway Lattiey
Attorney

Patented Nov. 8, 1938

2,135,796

UNITED STATES PATENT OFFICE 2,135,796

BRAKE

William A. Carnes, Houston, Tex.

Application March 21, 1936, Serial No. 70,085

2 Claims. (Cl. 188—75)

This invention relates to a brake.

An object of the invention is to provide a brake specially designed for use on draw work drums, although it is capable of use for other similar purposes.

Another object of the invention is to provide a brake having a drum provided with a flange with brake shoes mounted on the flange and provided with outwardly converging friction surfaces and opposing complemental segments having inwardly diverging friction surfaces and novel means for actuating the segments to bring said friction surfaces into and out of braking relation.

It is another object of the invention to provide in brake mechanism novel means for mounting and actuating the brake segments.

It is another object of the invention to provide in a brake a novel type of segment formed of sections capable of being adjusted to take up the wear incident to use.

Figure 1:
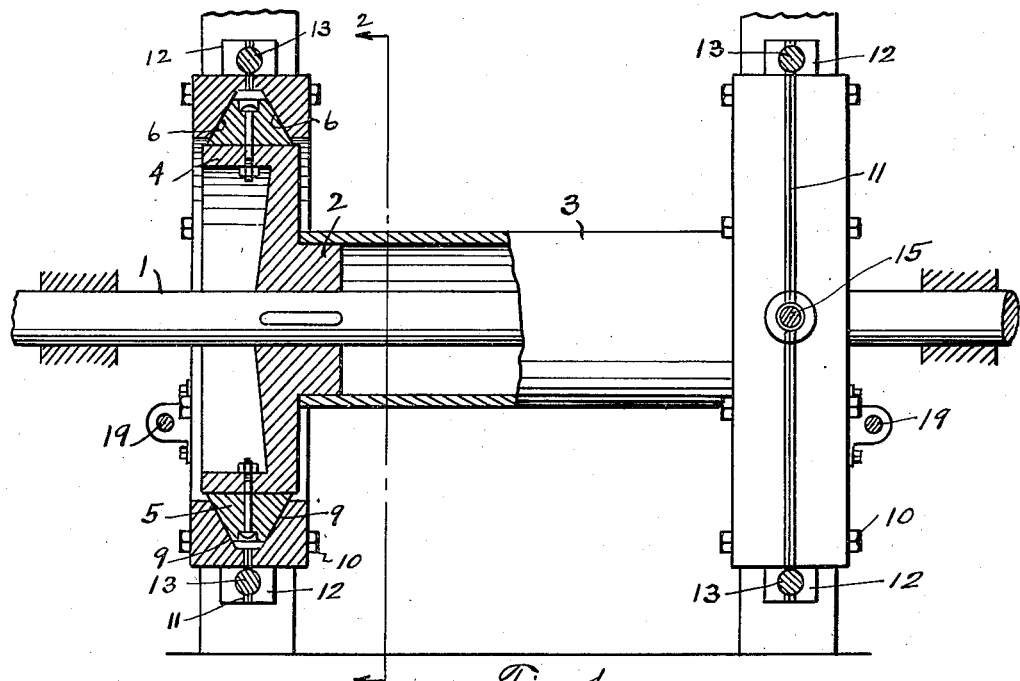
Figure 2:
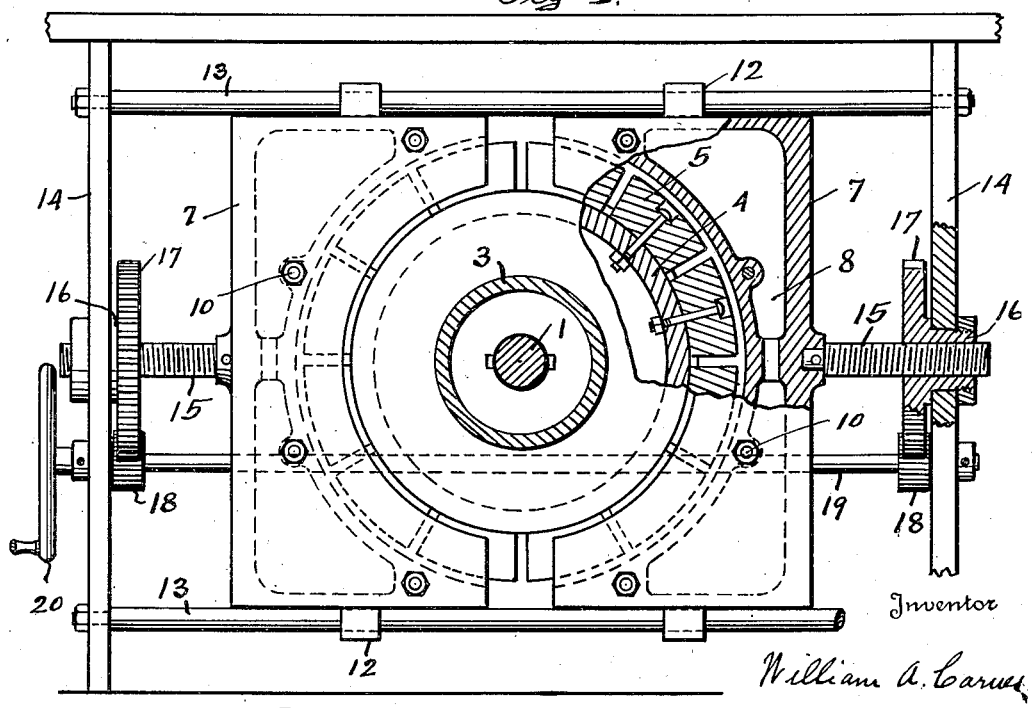

With the above and other objects in view the invention has particular relation to certain novel features of construction, operation and arrangement of parts, an example of which is given in this specification and illustrated in the accompanying drawing, wherein:

Figure 1 shows a side elevation of a brake drum shown partly in section, showing the brake segments associated therewith, and Figure 2 shows a transverse sectional view taken on the line 2—2 of Figure 1 and showing also the mechanism partly in section.

Referring now more particularly to the drawing wherein like numerals of reference designate similar parts in each of the figures, the numeral 1 designates a drum shaft on which the brake drums as 2 are splined. A cable winding drum as 3 is located between and fixed to the brake drums. Each drum 2 has a marginal drum flange 4 on which the brake shoes 5 are secured by bolts or any other preferred means. These shoes converge outwardly forming the friction faces 6, 6. As shown the shoes are spaced apart around the flange.

On opposite sides of each brake drum are the complemental segments 7, 7, which are preferably formed hollow and have the water circulating chambers 8 therein for cooling purposes and also having their inner sides arcuate and provided with the inwardly diverging friction faces 9, 9, which conform in shape to and are adapted to fit closely against the corresponding friction faces 6, 6 of the shoes.

Each segment is formed of sections, the sections being secured together by means of suitable bolts as 10, 10 and between the sections are suitable spacers 11, 11 which may be removed to permit the sections to be drawn closely together to take up for wear.

It will be noted that the apexes are truncated and the inside grooves in the segments are correspondingly shaped, the apexes of each shoe being spaced from the bottom of the groove as shown in the figures to allow for wear. The segments are oppositely arranged and have the upper and lower bearings 12, 12 to receive the upper and lower bearing rods 13, 13 which form tracks for the segments. The ends of these rods 13 are anchored to suitable legs 14, 14, provided for the purpose. Fastened to the respective segments and extended outwardly therefrom are the externally threaded shafts 15, 15 which are threaded through the nuts 16, 16. These nuts are mounted to rotate in the end legs 14, 14, and the nuts are provided with the spur gears 17, 17 which are in mesh with the pinions 18, 18, fixed on a transverse shaft 19 also mounted in bearings in the legs 14. One end of the shaft 19 has a suitable hand wheel 20 fixed thereon by means of which the shaft 19 may be turned and the segments adjusted to braked or released position at will.

The cable winding drum 3 is shown as equipped with two brakes, one at each end, although it will probably be found that a single brake at one end of the drum 3 will be sufficient. The friction surfaces may be formed of, or lined with, a suitable lining formed of approved material as desired.

The drawing and description disclose what is now considered to be a preferred form of the invention by way of illustration only, while the broad principle of the invention will be defined by the appended claims.

What I claim is:

1. Brake mechanism comprising a drum having spaced friction blocks thereon around the drum and formed with outwardly converging friction surfaces, brake segments having inside inwardly diverging arcuate friction faces and shafts connected to the segments, means having threaded connections with the shafts for actuating the shafts to move segments to move the friction faces thereon into and out of braking relation with the friction faces of said blocks.

2. A brake mechanism comprising a drum having a friction surface therearound, brake segments having inside friction faces shaped to conform to the shape of said drum surface, shafts connected to the segments, means having threaded connections with the shafts for actuating the shafts to move the sections to move the friction faces thereon into and out of braking relation with the friction surface of the drum.

WILLIAM A. CARNES.